(12) United States Patent
Gabriel

(10) Patent No.: US 8,708,415 B2
(45) Date of Patent: Apr. 29, 2014

(54) CHILD HEAD RESTRAINT SYSTEM AND METHODS USING SAME

(76) Inventor: John Gabriel, Old Bridge, NJ (US)

( * ) Notice: Subject to any disclaimer, the term of this patent is extended or adjusted under 35 U.S.C. 154(b) by 9 days.

(21) Appl. No.: 13/469,092

(22) Filed: May 11, 2012

(65) Prior Publication Data

US 2013/0300176 A1 Nov. 14, 2013

(51) Int. Cl.
*A47C 7/38* (2006.01)
*A47D 15/00* (2006.01)
*A63G 9/10* (2006.01)

(52) U.S. Cl.
USPC .................. 297/397; 297/464; 297/181

(58) Field of Classification Search
USPC ................ 297/397, 398, 399, 400, 401, 402, 297/411.37, 391, 393, 405–407, 181, 464, 297/219.12, 250.1, 216.11, 216.12
See application file for complete search history.

(56) References Cited

U.S. PATENT DOCUMENTS

| | | | |
|---|---|---|---|
| 2,869,621 A * | 1/1959 | Zukor | ............................ 297/400 |
| 4,607,885 A | 8/1986 | del Fierro | |
| 4,707,031 A | 11/1987 | Meistrell | |
| 5,311,882 A | 5/1994 | Gagne | |
| D395,781 S * | 7/1998 | Golder | ........................... D6/599 |
| 6,266,832 B1 | 7/2001 | Ezell | |
| 6,607,245 B1 | 8/2003 | Scher | |
| 6,793,287 B2 | 9/2004 | Dunk | |
| 6,973,691 B1 | 12/2005 | Cordova | |
| 7,631,935 B2 | 12/2009 | Chen | |
| 7,740,318 B2 | 6/2010 | Funke | |
| 8,141,955 B1 * | 3/2012 | Maassarani | ................... 297/393 |
| 2002/0140262 A1 | 10/2002 | Ossandon | |
| 2003/0234567 A1 | 12/2003 | O'Connor | |
| 2006/0244299 A1 | 11/2006 | Snedeker | |
| 2008/0034505 A1 | 2/2008 | Thomas | |
| 2008/0136232 A1 | 6/2008 | Hutchinson | |
| 2010/0102604 A1 | 4/2010 | Barnes | |
| 2010/0225149 A1 | 9/2010 | Noah | |

* cited by examiner

Primary Examiner — Milton Nelson, Jr.

(57) ABSTRACT

A head restraint system includes a first support arm formed of a flexible material. The head restraint further includes a first clamp arm coupleable to a child seat. A first joint for coupling the first support arm to the first clamp arm is configured to allow actuation of the first support arm between a first position extending horizontally across a portion of a child's forehead and a second position disposed away from the child's forehead.

6 Claims, 8 Drawing Sheets

CHILD HEAD RESTRAINT SYSTEM AND METHODS USING SAME

FIELD

The present invention relates to the field of child car seats, strollers, booster seats, and the like; and more particularly to a child or toddler head restraint or support system for the same. In addition, the invention is directed to methods of using same.

BACKGROUND

Children and infants are typically transported in car seats. The American Academy of Pediatrics and other child passenger safety organizations endorse certain philosophies for transporting children based on their age and/or weight. For example, a universally accepted philosophy is to keep infants and toddlers placed in infant seats and rear-facing convertible seats until they are over 1 year of age or until they reach the highest weight (typically 20 pounds) or height allowed by their car safety seat's manufacturer. Children 1 year or older, are encouraged to use a forward-facing car safety seat with a harness for as long as possible, up to the highest weight or height allowed by their car safety seat's manufacturer.

While seated in a typical forward-facing car safety seat, an infant or child is restrained at the torso with a seat belt. Many of these seats lack a head support or head restraining device that is capable of providing the proper support for the head of the child. In the event of a collision or during sudden braking, the infant or child's head may be thrust forward resulting in neck injury (e.g., flexion injury). This phenomenon is particularly true for younger children whose head-to-body size ratio is larger. In such situations, the increased mass of the head in relation to the neck and body could result in traumatic injury. Furthermore, when infants and children fall asleep in a car seat, their heads often drop forward to their chests or slumped over the side of the arm rest awkwardly. Not only is such a position uncomfortable for the child but it exerts dangerous loads on the neck of the child, potentially impairing breathing. Such a position also leaves the child especially vulnerable to severe trauma should hard braking and/or an accident occur at this time.

Current devices attempt to solve this problem, but do not do so as adequately or safely. In some prior art devices, straps are configured to go across the forehead of a child. These straps may pose a strangulation hazard if the child shifts positions suddenly or if the vehicle makes a sharp turn. Moreover, these straps are prone to user error and may result in severe injury if used improperly. Other prior art solutions have employed strategically placed side pillows, and various aftermarket attachments to attempt to securely and reliably hold and support a child's head from being thrust forward, all to no avail. Typically, these devices do not provide sufficient support for the child's head and neck. For example, side support systems provide a place for the child to lean his head but will not restrain the head during braking or swerving. Other mechanisms, which claim to provide support against forward movement of the head, use various combinations of straps, Velcro attachments and/or hats; however, these devices are not effective and pose a strangulation risk. Other systems are clumsy and unreliable. There are no available devices that provide supportive yet comfortable support at the front of the child's head. Thus the prior art fails to provide the proper support for the head, and do not offer a good attempt to prevent potentially severe head or neck injury or the potential difficulty in breathing.

It is therefore an object of the present invention to provide a head support system that provides adequate support for the head of a toddler or child.

It is another object of the present invention to provide said support in a safe yet comfortable manner.

Other objects and advantages of the present invention and/or of the currently preferred embodiments thereof will become more readily apparent in view of the following detailed description of the currently preferred embodiments and accompanying drawings.

BRIEF SUMMARY

In some embodiments, the present invention provides an integrated car seat and head restraint system that provides supportive, reliable and comfortable support at the front of the head. The head restraint system provides increased head and neck stability upon turning, braking or collision—most effective when used while the user is asleep. The head restraint portion of the device may include a padded sturdier support system to provide support in the front of the forehead when it swivels and locks into a position in front of the child's head. A small gap may be disposed between the child's forehead and the support to allow for comfort. The child's head may be kept safe, stable and in an upright position should there be a sudden stoppage, collision or braking, and especially when the child falls asleep.

In at least some embodiments, the head restraint system includes a cushioned, contoured head support extending horizontally across the forehead of a child. The head support is formed of a semi-flexible material and is configured and arranged to pivot between a first position and a second position. A pair of pivots is also included, each of which are coupled to one end of the support arms.

In at least some embodiments, the head restraint system comprises a first support arm extending horizontally across the forehead of a child. The cross support is formed of a semi-flexible material and is configured and arranged to pivot between a first position and a second position. A second support arm is included and is substantially aligned with the first support arm. A first pivot is coupled to the first support arm and a second pivot is coupled to the second support arm, the second pivot being capable of actuation independently of the first pivot.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1A:
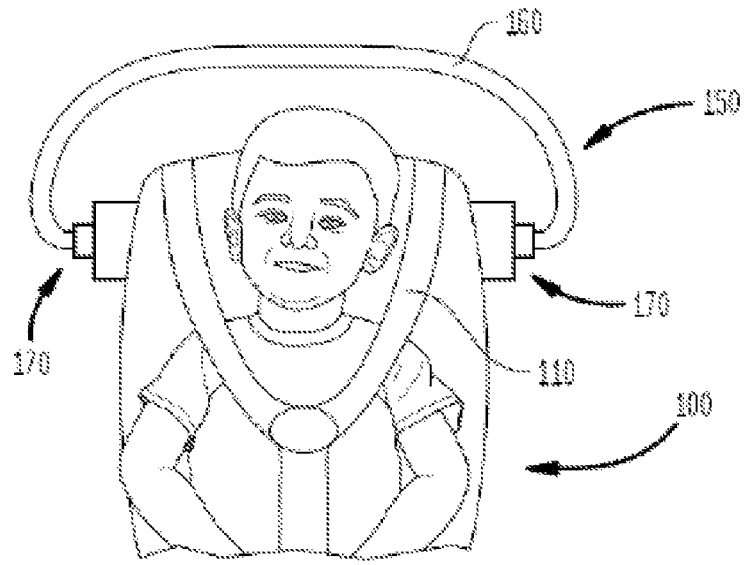
FIG. 1A is a schematic front view of a first embodiment of a head restraint system according to the present invention.

FIG. 1A is a schematic front view of a first embodiment of a head restraint system according to the present invention. As seen in FIG. 1A a child is placed in a car seat 100 used to transport children or infants in vehicles. The car seat 100 may include a seat belt 110 to keep the child in the seat while a vehicle is in motion. The seat belt 110 typically supports the body of the child but is incapable of providing support for the head of the child. The car seat 100 of FIG. 1A further includes a head restraint system 150 configured and arranged to provide support for the head of the child.

As seen in FIG. 1A, the head restraint system 150 includes a cross support 160 extending horizontally across the child seat 100 at a vertical position that substantially aligns with the child's temple or forehead. The cross support 160 may be formed of a soft, flexible material or a semi-flexible material like a slightly heavier foam/cushion or rubber, surrounded by any of a softer foam/cushion, a softer pillow-like material, and a removable, hypoallergenic, breathable fabric or any combination thereof. Any other material used may include any bendable material that will not easily break (e.g., not brittle) or splinter or shatter or have any sharp edge. As used herein, the term "semi-flexible" may refer to a material that is rigid enough to support the weight of the child's head but is also capable of being deformed or bent by an adult to a suitable shape or being sufficiently deformable in order to mitigate force from the forehead of a child in the event of a sudden movement (e.g., during a crash or sudden braking) In at least some embodiments, the semi-flexible cross support 160 is contoured to conform to a child's head.

The cross support 160 extends between two pivots 170 on the side of the car seat 100. In at least some embodiments, these two pivots (or joints) 170 are vertically aligned on the sides of the car seat 100 as seen in FIG. 1A. Pivots 170 may further be mounted on tracks 190 so they are capable of sliding in the vertical position to accommodate children of different heights. In some embodiments, tracks 190 allow the pivots 170 to be displaced in the vertical direction for a total of one foot. A knob or plurality of knobs may be coupled to the pivots to move the pivots 170 vertically along the track 190. In at least some embodiments, a knob is disposed in the back of the car seat 100 and coupled to the pivots so that when a parent manually actuates the knob, the head restraint 150 is moved up and/or down in the vertical direction. In this manner, the head restraint 150 may be adjusted as the child grows. In addition, Pivots 170 are configured to actuate the cross support 160 of the head restraint systems 150 as will be described in more detail with references to FIGS. 1B-1D.

Figure 1B:
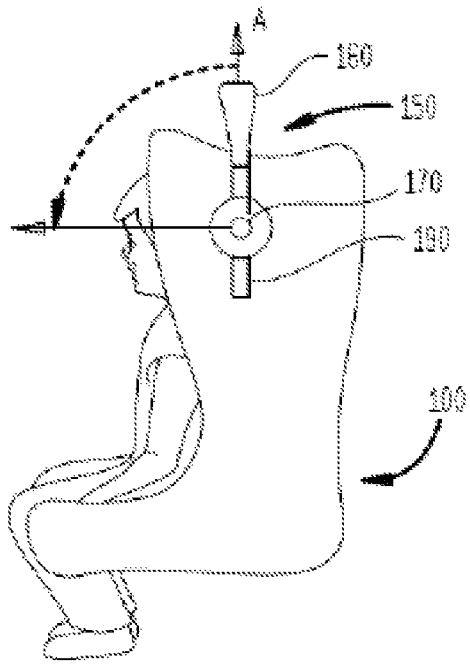
FIG. 1B is a schematic side view of the head restraint system of FIG. 1A with the head restraint system in a first position.

FIG. 1B is a schematic side view of the head restraint system 100 of FIG. 1A with the head restraint system 150 in a first position. As seen in FIG. 1B, the head restraint system 150 is disposed in a first position, A. At position A, the pivots 170 are actuated such that the cross support 160 is disposed at a position substantially above and vertically aligned with the pivots 170. With the head restraint system 150 disposed at position A, a child can be easily loaded and unloaded from the car seat 100.

Figure 1C:
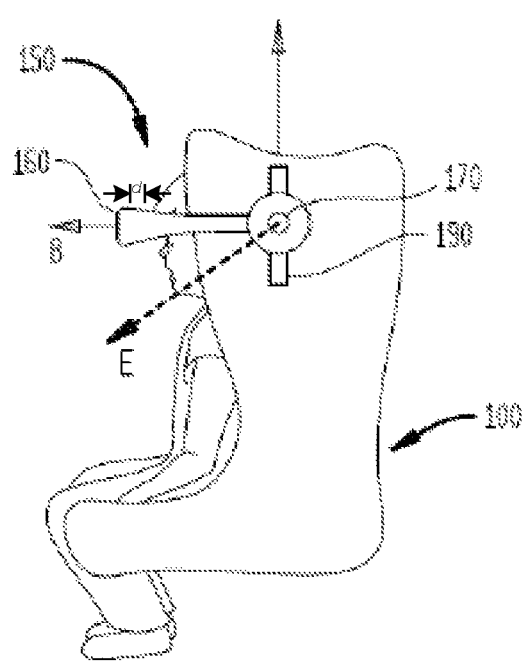
FIG. 1C is a schematic side view of the head restraint system of FIG. 1A in a second position.

With the child loaded into the car seat 100, the head restraint system 150 may be moved into position to provide support for the child's head. FIG. 1C is a schematic side view of the head restraint system of FIG. 1A in a second position, B. As seen in FIG. 1C, at position B the cross support 160 of head restraint system 150 is disposed in front of and substantially horizontally aligned with pivots 170. With the cross support 160 disposed at position B, a 90 degree angle is formed between the cross support 160 and the vertical axis. Thus, by actuating pivots 170, the cross support 160 may be moved from an open position A to a secure second position B. It will be understood that the secured position need not be directly aligned with the pivots 170, which is described as position B. Instead, the pivots 170 may define any number of positions along an arc between a vertical position A and the horizontal position B. For example, the cross support 160 may be moved to a third position between the vertical position A and the horizontal position B to accommodate a taller child. Alternatively, the cross support may be moved to a third position past the horizontal position B to accommodate a shorter child. In at least some embodiments, the pivots 170 include a maximum position, E, provided as a safety mechanism to prevent the head restraint system 150 from closing too far on the child.

Furthermore, as seen in FIG. 1C, with the cross support 160 in the second actuated or secured position B, a gap "d" is disposed between the cross support 160 and the forehead of the child. Gap "d" is provides for added comfort of the child. On long trips, a support member will aggravate and annoy a child regardless of the softness of the material used. Thus, by providing a small gap "d," the child is afforded an extra measure of comfort. The gap "d" should, however, be minimized. If the distance "d" is too great, the cross support 160 will be incapable of providing adequate support for the child's head. In some embodiments, the distance d is between 0.1 inches and 6.0 inches and will vary based on the size of the child-slightly larger space allowed for larger individuals.

Figure 1D:
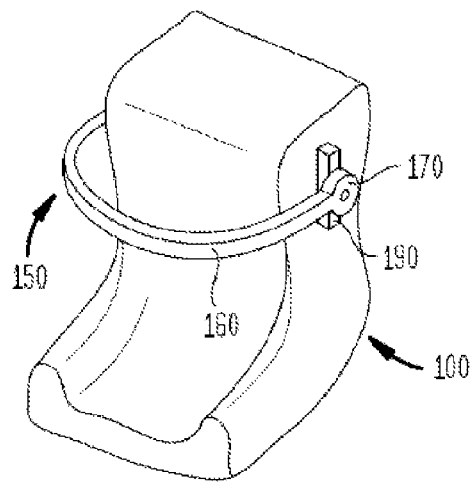
FIG. 1D is a schematic perspective of the head restraint system of FIG. 1A with the head restraint system in a second position.

FIG. 1D is a schematic perspective of the head restraint system of FIG. 1A with the head restraint system in the second position. As in FIG. 1D, the head restraint system 150 may be made integral with the car child seat 100.

Figure 2:
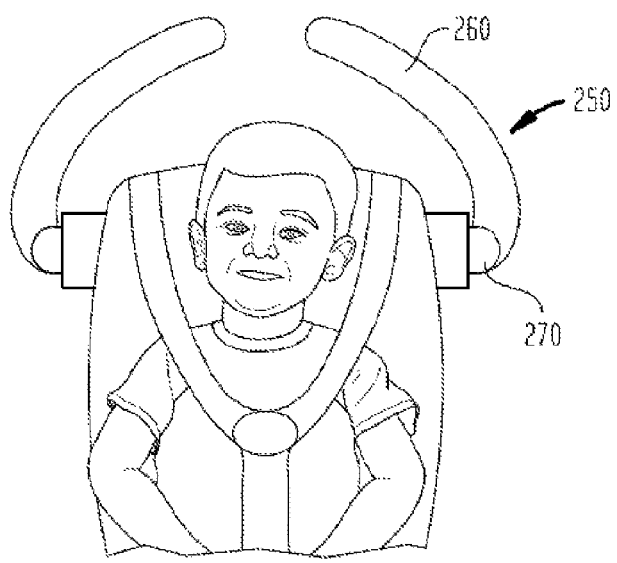
FIG. 2 is a schematic of a second embodiment of a head restraint system according to the present invention.

FIG. 2 is a schematic of a second embodiment of a head restraint system 150 according to the present invention. As seen in FIG. 2 the head restraint system 150 is coupled to the car seat 100 similar to that of the first embodiment described above. In contrast to the first embodiment, FIG. 2 shows a head restraint system 250 including a pair of support arms 260 instead of a cross support.

Specifically, the head restraint system 250 includes a pair of individually pivotable and actuatable support arms 260. Support arms 260 may be formed of semi-flexible material encased in cushion and/or felt as described above with reference to the cross support 160. Each of the support arms 260 is coupled to a pivot 270 disposed on the side of the car seat 100. The support arms 260 may be actuated individually between a series of positions as described above with respect to the cross support 160 of the first embodiment. In contrast to the first embodiments, the support arms 260 are configured so that one support arm 260 may be disposed at position A while the other support arm 260 is disposed at position B.

In at least some other embodiments, though the support arms 260 are separate, the pivots 270 on either side of the car seat 100 may be coupled so that the support arms 260 move together from one position to the next. Thus, the head restraint system 250 may provide adequate support for the forehead of a child while slightly minimizing the obstruction across the head of the child. Individual support arms 260 may further provide an added measure of safety for the child.

In at least some embodiments, the individual support arms 260 may be configured so that they mate halfway across the car seat. In such embodiments, the support arms 260 may be configured so that they mate to form a single cross support across the child seat, which may or may not separate or come apart at a predetermined force.

Figure 3:
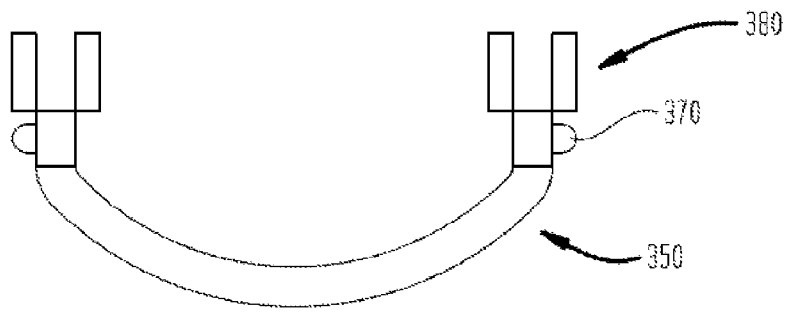
FIG. 3 is a schematic of a third embodiment of a head restraint system according to the present invention.

FIG. 3 is a schematic of a third embodiment of a head restraint system according to the present invention. The head restraint system 350 of FIG. 3 is similar to the head restraint system of 150 of the first embodiment. In contrast to the head restraint system 150, head restraint system includes a pair of fastening clips 380 coupled to pivots 370. Fastening clips 380 may be formed as alligator clips or clothespin clips with sufficient force and rigidity to fasten the head restraint system 350 to a car seat, with or without the assistance of further supporting devices like VELCRO. In this manner, the head restraint system may be utilized on a plurality of car seats or used to provide support for some other seat for the child. It will be understood that the embodiments described herein include elements that are interchangeable whether the head restraint systems are unitarily formed or coupleable to a standard child safety seat.

Figure 4:
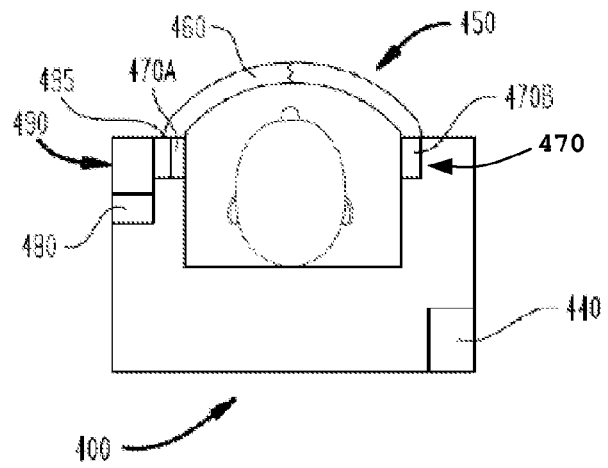
FIG. 4 is a schematic top view of one embodiment of a motorized head restraint system according to the present invention.

FIG. 4 is a schematic top view of one embodiment of a car seat 400 having a mechanized head restraint system 450 according to the present invention. The mechanized head restraint system 450 includes a cross support 460 extending horizontally across the child seat 400 at a vertical position that substantially aligns with the child's temple or forehead. The cross support 460 may be formed of a semi-flexible material encased in cushion and/or felt and include any material or combinations of materials as described above.

As seen in FIG. 4, in the mechanized head restraint system 450, the cross support 460 extends between two pivots 470 on the side of the car seat 400. The pivots 470 may be configured as a first driving end 470A and a second driven end 470B. In at least some embodiments, the driving end 470A is coupled to a motor 480. The motor 480 may actuate the driving end 470 to pivot the cross support 460 in a manner similar to that described above with reference to FIGS. 1B-1D. Motor 480 may be disposed within housing 490. Housing 490 may be disposed to one side of the head restraint system 450. Housing 490 encases motor 480 to protect it from the environment and to limit contact with the motor 480 by the user and/or other objects in the vicinity of the motor 480.

Figure 6:
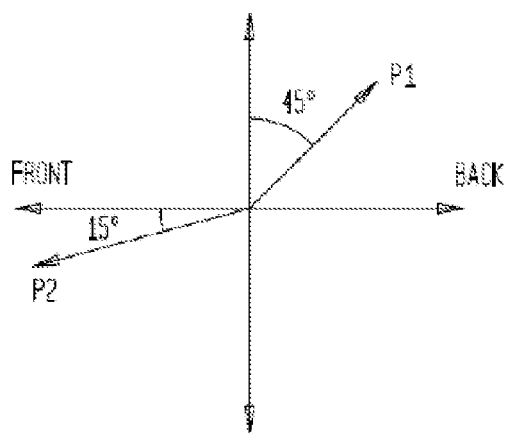
FIG. 6 is a schematic representation of the range of motion of the cross support according to the present invention.

In at least some embodiments, the head restraint system 450 includes a safety mechanism. For example, housing 490 may include a rotation limiter 495. Rotation limiter 495 allows the motor to actuate the cross support 460 in a range of positions. In at least some embodiments, rotation limiter 495 prevents the cross support 460 from moving past a predetermined range. For example, as seen in FIG. 6, the cross support 460 is capable of moving through a range of approximately 150 degrees (e.g., from a position of approximately 45 degrees behind the vertical plane (P1) to a position of approximately 15 degrees below the horizontal plane (P2).

Alternatively, the head restraint system 450 may include a sensor (not shown) configured and arranged to identify the location of cross support 460. If the sensor determines that the cross support 450 has moved to a dangerous position, the cross support 460 may be automatically actuated in the reverse direction to move away from the child's head. In at least some other embodiments, the sensor is configured to sense contact with the head of the child. As discussed above, a gap "d" may be preferably disposed between the head of the child and the cross support 460. Thus, a sensor may be configured to sense contact between the head of the child and the cross support 460. Said sensor may be electrical or mechanical and may be disposed on the cross support 460, the pivots 470 or on some other portion of the head restraint system 450.

Power to motor 480 may be supplied by a power source, such as a battery 440 that is in electrical communication with motor 480. Battery 440 may be coupled to motor 480 and disposed within housing 490 or within a secondary housing as seen in FIG. 4. In at least some embodiments, the motor 480 is coupleable to an outlet or other electrical connection where the car seat is to be placed.

Also as seen in FIG. 4, the cross support 460 may include a tear-away portion 490 that disconnects, dissociates, or otherwise detaches in the event of excessive force (e.g., a motor vehicle accident). Thus, the cross support 460 may provide support for the forehead of a child, but not obstruct or otherwise adversely impact a child in the event of an accident.

Figure 5:
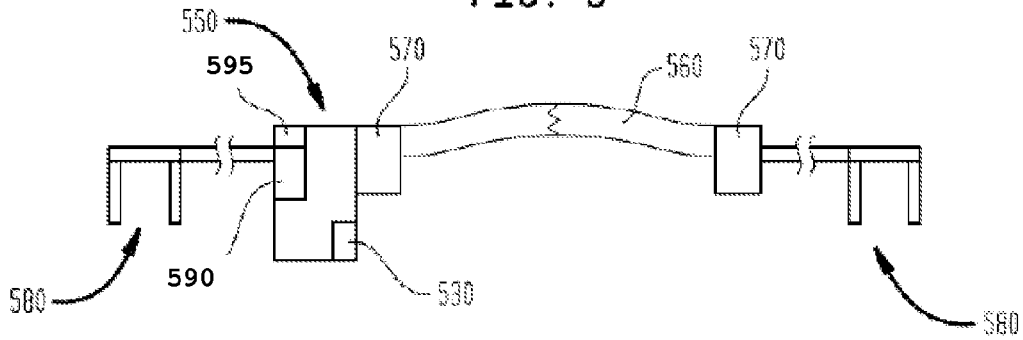
FIG. 5 is a schematic top view of a second embodiment of a motorized head restraint system according to the present invention.

FIG. 5 is a schematic top view of a second embodiment of a motorized head restraint system 550 according to the present invention. The embodiment shown in FIG. 5 is similar to that of FIG. 4 and includes a motor 590, a rotation limiter 595 and a battery 530. Specifically, the mechanized head restraint system 550 includes a cross support 560 extending horizontally across a child seat at a vertical position that substantially aligns with the child's temple or forehead. The cross support 560 may be formed in the same manner and using the same materials discussed above. In contrast to the head restraint system 450, head restraint system 550 includes a pair of fastening clips 580 coupled to pivots 570. Fastening clips 580 may be formed as alligator clips or clothespin clips, further supported with VELCRO or like material, with sufficient force and rigidity to fasten the head restraint system 550 to a car seat. In this manner, the head restraint system may be utilized on a plurality of car seats or used to provide support for some other seat for the child.

Figure 7:
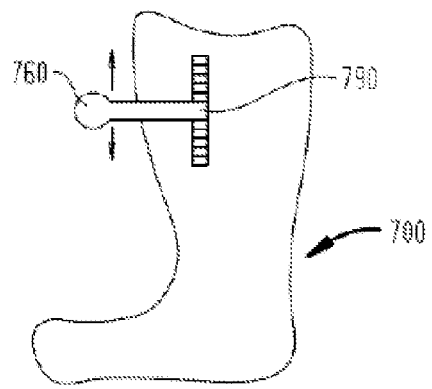
FIG. 7 is a schematic side view of a fifth embodiment of a sliding head restraint system according to the present invention.

FIG. 7 is a schematic side view of a fifth embodiment of a sliding head restraint system 700. The head restraint system 700 is similar to the embodiments discussed above and includes a cross support 760 having semi-rigid and soft components as previously noted. In contrast to the embodiments discussed above, the cross support 760 is actuatable in the vertical direction as seen in FIG. 7. Cross support 760 may be mounted onto tracks 790 and may be brought vertically down into position when needed. Thus, instead of pivoting into position as discussed above, the sliding head restraint system 700 may be actuated in a purely vertical motion.

Figure 8A:
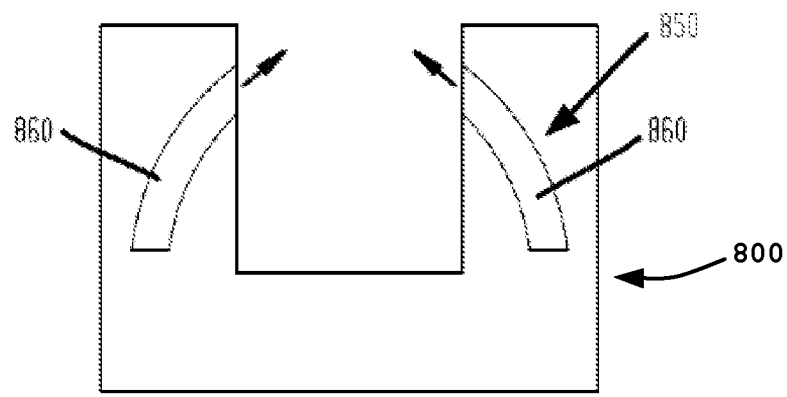
FIG. 8A is a schematic top view of a sixth embodiment of an extendable head restraint system in the initial position according to the present invention.
Figure 8B:
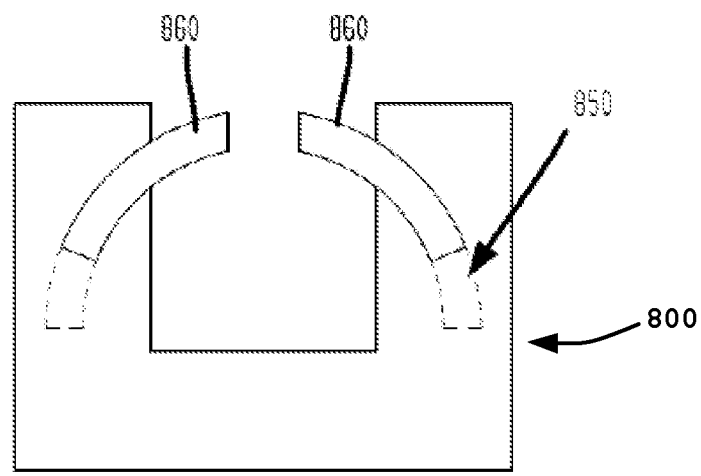
FIG. 8B is a schematic top view of the head restraint system of FIG. 8A in the extended position according to the present invention.

FIG. 8A is a schematic top view of a sixth embodiment of an extendable head restraint system 800 in the initial position according to the present invention. The extendable head restraint system 800 includes a pair of support arms 860 that extend in the horizontal plane between two positions. As seen in FIG. 8A and 8B, the support arms 860 may include a curved member that supports the head of the child when necessary and retracts out of reach in the initial position. The head restraint system may include a pair of sleeves 850 into which the supports arms 860 retract. The support arms 860 may extend and retract into position in a substantially linear or curved motion. One advantage of this embodiment is that the support arms 860 may be retracted out of sight and away from the child's head when not in use.

Figure 9:
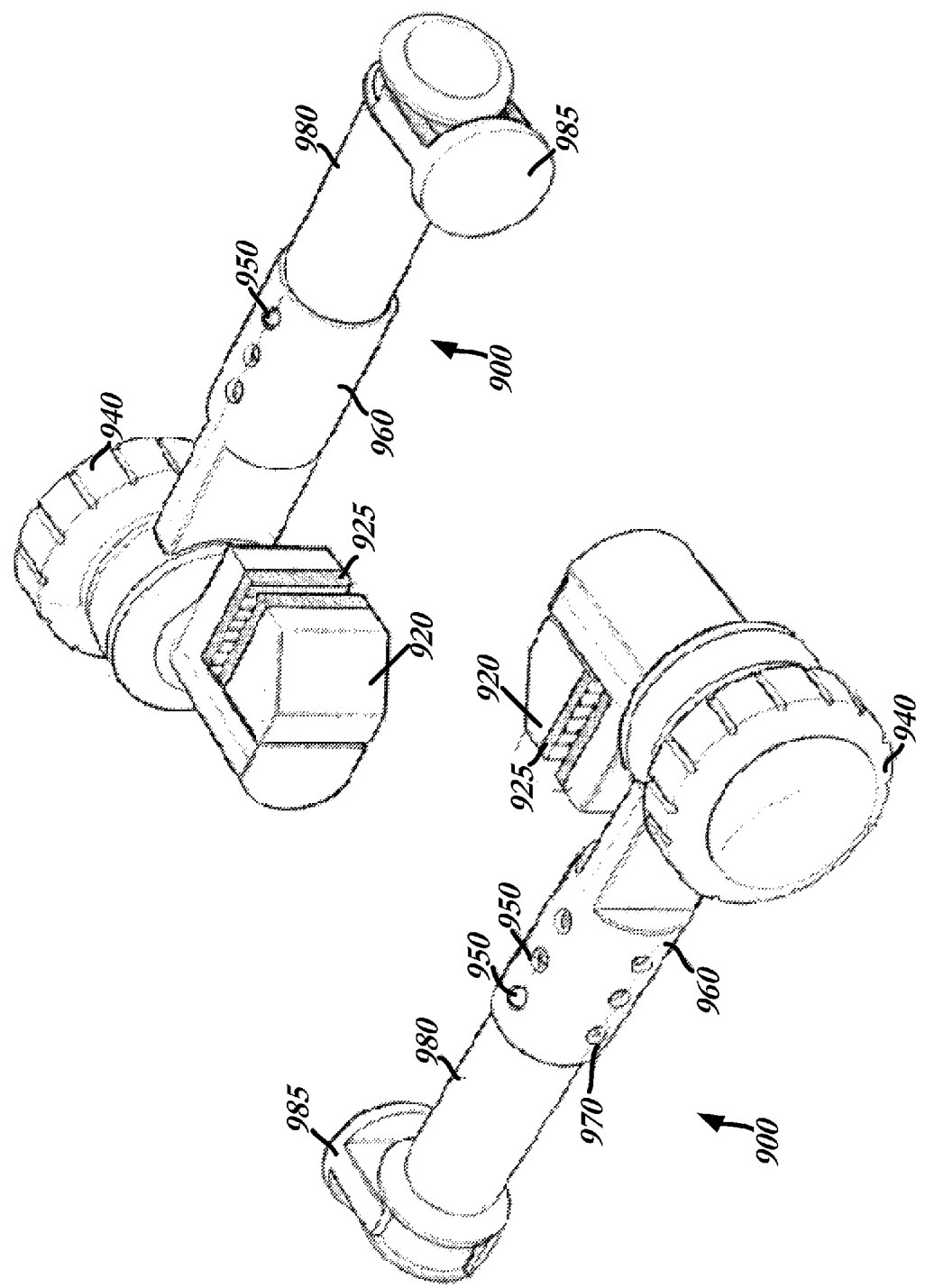
FIG. 9 is an elevational side view of a telescoping clamp arm according to the present invention.

FIG. 9 illustrates another embodiment of a clamp arm 900 for use with a head restraint system. As seen in FIG. 9, the clamp arm 900 includes a fastener 920 having two opposing surface 925 for grasping a portion of a child seat. The opposing surfaces 925 may be gradually brought closer together by turning adjustment knob 940. In at least some examples, the user may actuate adjustment knob 940 by gripping the knob and turning it, thereby tightening the fastener 920 onto a portion of the child seat.

Clamp arm 900 further includes a support arm 960 for receiving therein a telescoping arm 980. Telescoping arm 980 may be configured to translate within support arm 960 in order to adjust the length between fastener 920 and joint 985. A plurality of slots 950 disposed on support arm 960 may be capable of receiving pins 970 disposed on or coupled to the telescoping arm 980. As seen in FIG. 9, support arm 960 includes a plurality of slots 950 at varying positions. The user may select the appropriate length of the clamp arm 900 by choosing which slots 950 will receive pins 970. It will be understood that a mirror image of clamp arm 900 may be disposed on the opposite side of the child seat as will be appreciated from FIG. 9.

Figure 10:
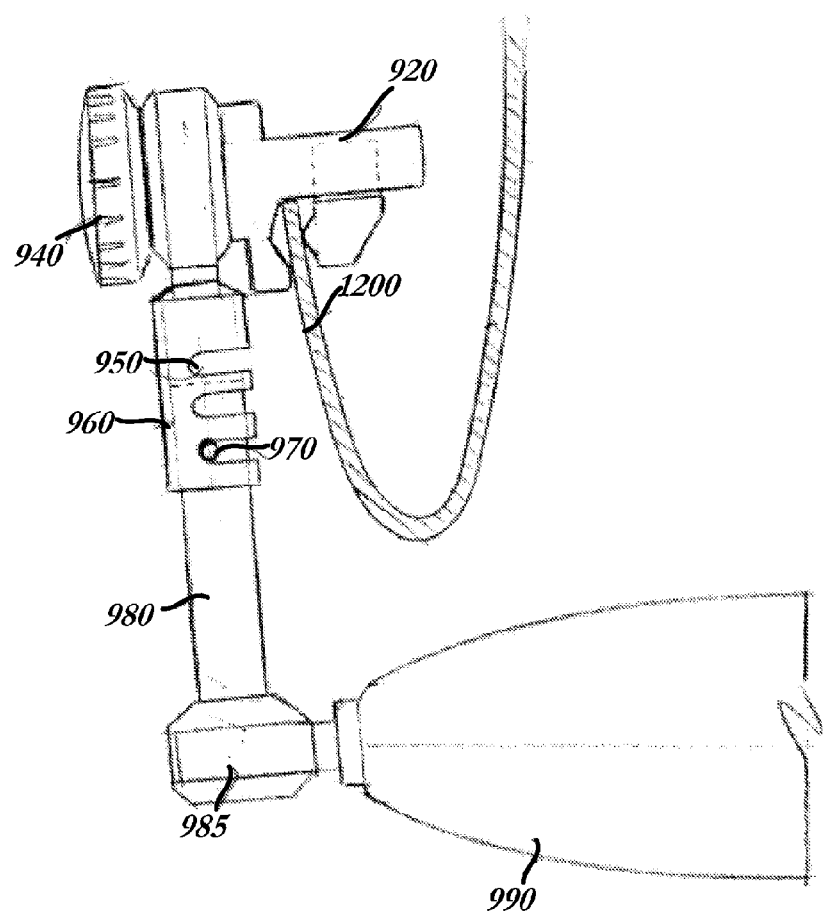
FIG. 10 is a top view of a head restraint device having a clamp arm according to the present invention.

FIG. 10 illustrates the use of clamping arm 900 on the side wall 1200 of a child seat. As seen in FIG. 10, fastener 920 is coupled to the side wall 1200 of the child seat. Slots 950 have received pins 970 to form the appropriate length of clamp arm900. With the clamp arm in place, joint 985 may be actuated to bring a flexible, or semi-flexible support 990 in place in front of a child's forehead. Though joint 985 is illustrated in FIG. 10 as a saddle joint, it will be understood that any type of suitable joint may used to connect support 990 to clamp arm 900 including ball and socket, hinge or other suitable joints.

Figure 11:
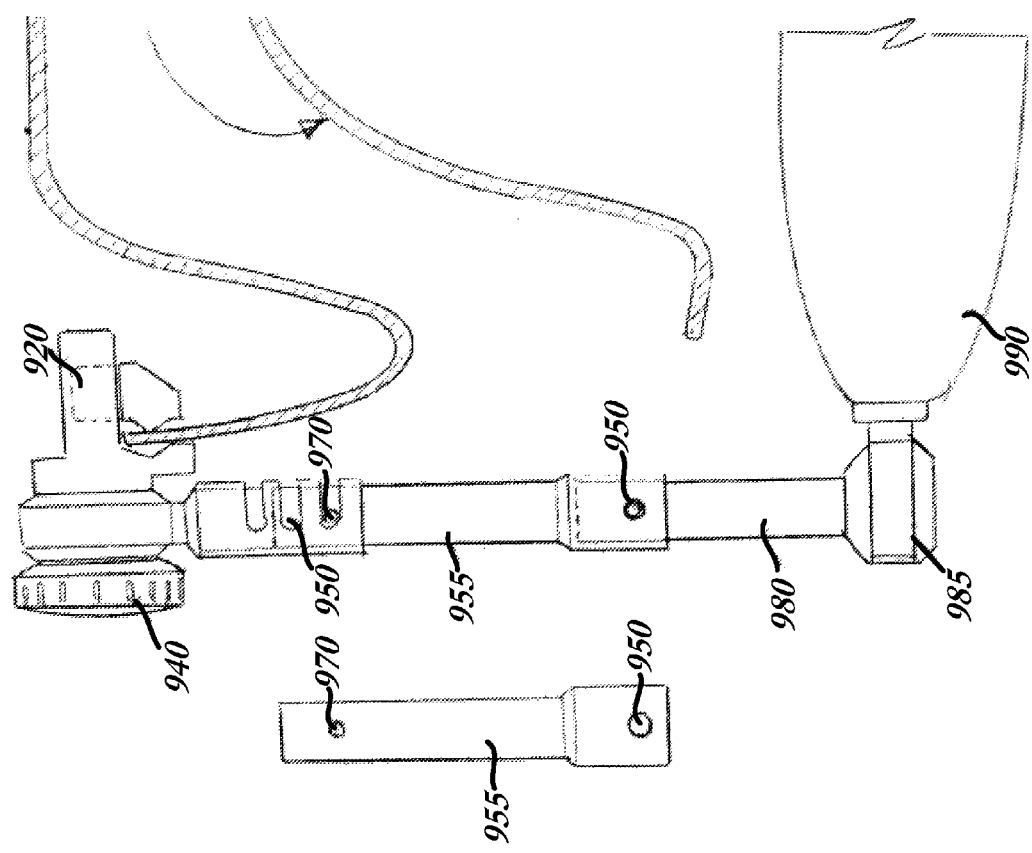
FIG. 11 is a top view of a head restraint device having a clamp arm and an extension according to the present invention.

FIG. 11 illustrates a head restraint device 1000 similar to that of FIG. 10 with the exception that the device 1000 of FIG. 11 includes an additional extension 955 for providing additional length to the clamp arm. Extension 955 may include slots 950 and pins 970 to couple to the slots and pins of the support arm 960 and telescoping arm 980. As discussed above, child seats are manufactured in a variety of shapes and sizes. Thus, in embodiments where the side wall 1200 is receded, extension 955 may be used to provide the appropriate length.

Figure 12:
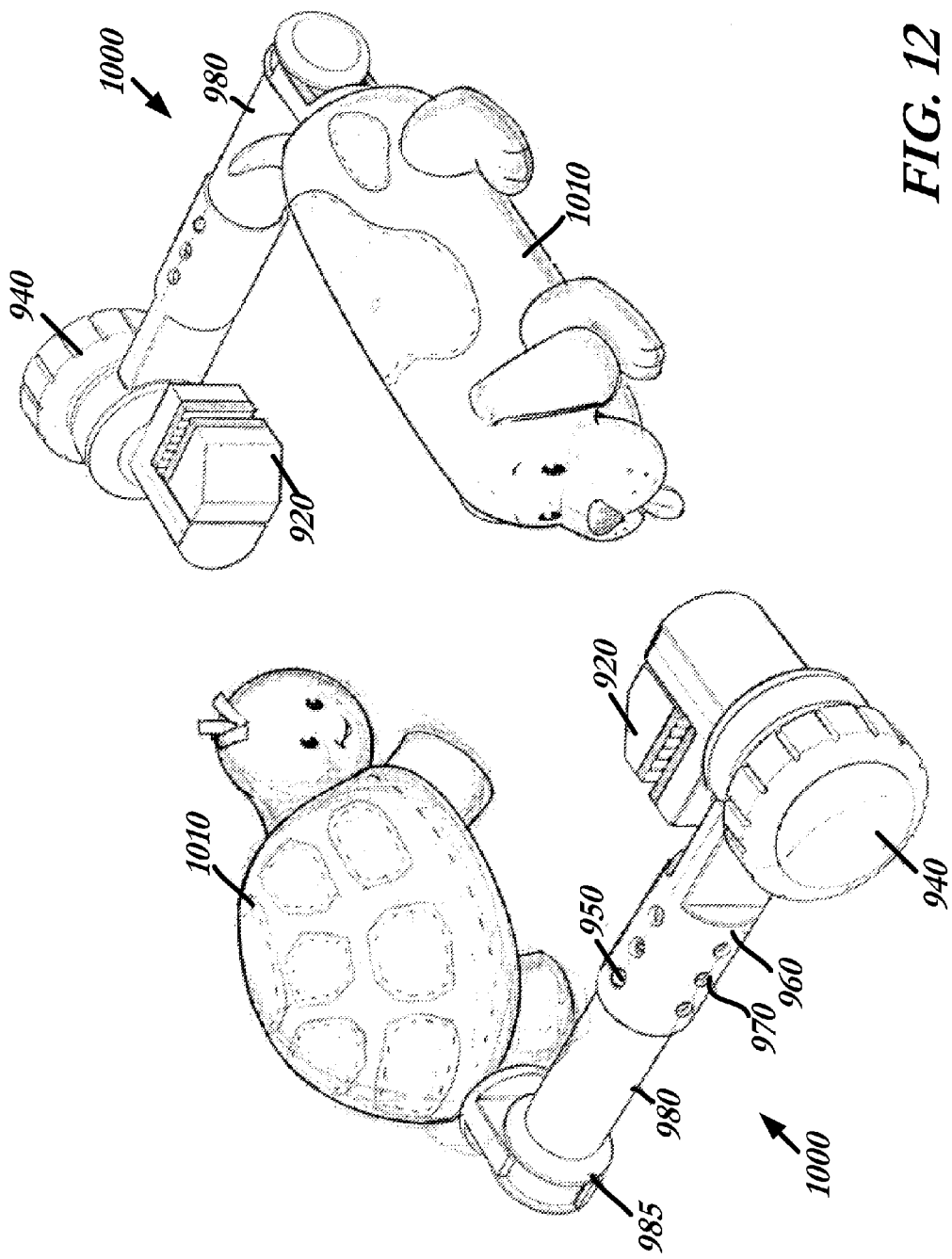
FIG. 12 illustrates a head restraint device 1000 including a character cushion 1010 according to the present invention.

FIG. 12 illustrates a head restraint device 1000 including a character cushion 1010. Character cushion 1010 may be formed as a plush or stuffed animal and may function as the support for the child's head. In at least some examples, character cushion 1010 may be sewn from cloth, plush, or other textiles, and stuffed with straw, beans, beads, plastic pellets, cotton, synthetic fibers, or other similar material to form a soft support for a child's head. As seen in FIG. 12, character cushion 1010 may take the appearance of a stuffed animal to provide a friendly and playful travel companion for the child.

In contrast to prior art devices, character cushion 1010 calms a child and makes use of the head restraint device 1000 less frightening and less intimidating for a child or infant.

As may be recognized by those skilled in the pertinent art based on the teachings herein, numerous changes and modifications may be made to the above-described and other embodiments of the present invention without departing from its scope as defined in the appended claims. For example, the head restraint system may be used on airplanes, trains, adult passenger seats, strollers, child passenger bicycle seats, rollercoasters or any such transportation medium where an individual might fall asleep and need gentle head support.

The head restraint system may also be used for any children or adults of any age or in any application where support of the head and neck is desired. Moreover, as will be understood by those having ordinary skill in the art, any of the embodiments discussed herein may be manufactured and/or configured to be manually actuatable, motorized or remote-controlled. As such, the configurations discussed herein may be combined, modified or the components rearranged and this detailed description of preferred embodiments is to be taken in an illustrative, as opposed to a limiting sense.

What is claimed is:

1. A head restraint system comprising:
a first support arm formed of a flexible material;
a first clamp arm coupleable to a child seat; and
a first joint for coupling the first support arm to the first clamp arm and configured to allow actuation of the first support arm between a first position extending at least partially across a portion of a child's forehead and a second position disposed to one side of the child's forehead;
wherein the first clamp arm includes at least one pin and a plurality of slots for receiving the at least one pin, the plurality of slots being arranged such that the length of the first clamp arm varies based on the slot selected for receiving the at least one pin.

2. The head restraint system of claim 1, further comprising a character cushion encasing a portion of the first support arm.

3. The head restraint system of claim 1, wherein the first clamp arm comprises a separable extension.

4. The head restraint of claim 1, further comprising:
a second support arm formed of a flexible material;
a second clamp arm coupleable to the child seat; and
a second joint for coupling the second support arm to the second clamp arm and configured to allow actuation of the second support arm between a first position extending at least partially across a portion of the child's forehead and a second position disposed to an opposing side of the child's forehead, the second joint being capable of independent actuation from the first joint.

5. The head restraint system of claim 4, wherein the first support arm is configured and arranged so that a gap is defined between the first support arm and the child's forehead in the first position.

6. A head restraint system comprising:
a first support arm formed of a flexible material;
a first clamp arm coupleable to a child seat; and
a first joint for coupling the first support arm to the first clamp arm and configured to allow actuation of the first support arm between a first position extending at least partially across a portion of a child's forehead and a second position disposed away from the child's forehead;
wherein the first clamp arm includes at least one pin and a plurality of slots for receiving the at least one pin, the plurality of slots being arranged such that the length of the first clamp arm varies based on the slot selected for receiving the at least one pin.

* * * * *